June 23, 1964
M. L. BUEHLER ETAL
3,138,693
WELDING APPARATUS
Filed June 5, 1962
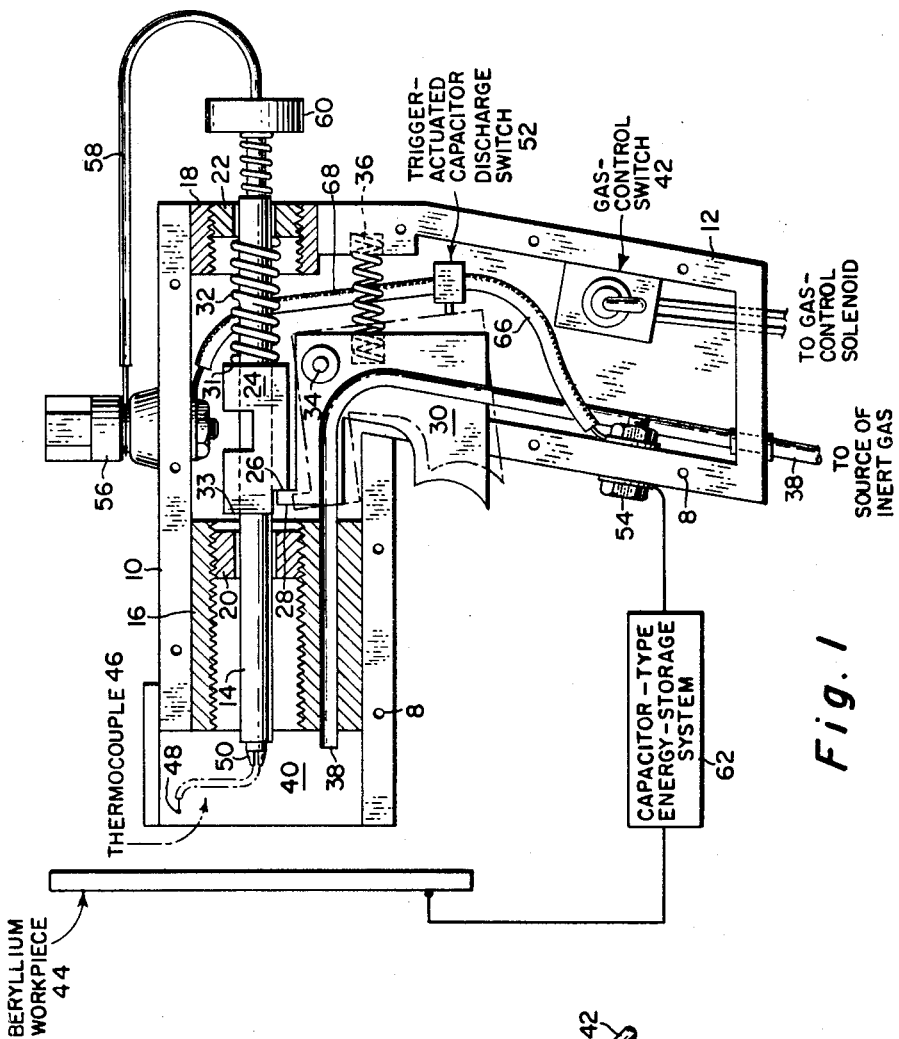
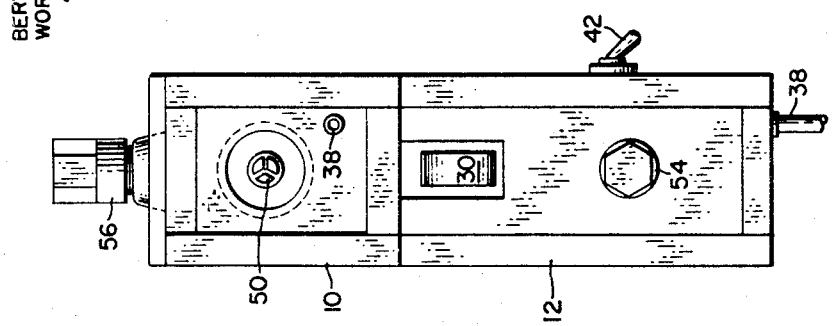
INVENTORS
MARVIN L. BUEHLER
EDWARD R. PIERRE
BY
*Howard J. Mulvey, Jr.* AGENT
*George J. Ruberto*
ATTORNEY

United States Patent Office 3,138,693
Patented June 23, 1964

3,138,693
WELDING APPARATUS
Marvin L. Buehler, San Jose, Calif., and Edward R. Pierre, Appleton, Wis., assignors, by mesne assignments, to the United States of America as represented by the Secretary of the Navy
Filed June 5, 1962, Ser. No. 200,294
3 Claims. (Cl. 219—95)

The present invention relates to electric welding, and, more particularly, to a portable welding unit specifically designed to retain and position articles of small physical dimensions prior to and during the time that they are being welded to a base member or workpiece.

Many welding gun constructions are known in the art which incorporate a barrel containing an electrode capable of being brought into contact with a joint to be welded when the trigger of the welding gun is actuated. Following such contact between the electrode and the workpiece, current passes through a closed circuit to generate sufficient heat in the contacting region to produce a spot weld at the joint.

While this so-called resistance method of spot welding is satisfactory in many applications, considerable difficulty has been experienced in utilizing such a procedure when the workpiece or base member is composed of some metal such as beryllium, especially when the article to be attached to this beryllium workpiece is, for example, a thermocouple having extremely small physical dimensions. The problem of holding this article in proper position, and then passing therethrough sufficient heat to produce a strong weld, has heretofore not been satisfactorily solved. The matter is rendered still more difficult of solution when the thermocouple is of the Chromel-Alumel type, since experience has shown that standard processes for welding such members tend to develop a layer of beryllium oxide between the thermocouple and the base member. This intermediate oxide layer greatly weakens the joint, and results in a relatively high percentage of rejects which not only add to the per unit cost of the completed assembly but may also disrupt normal production schedules.

To overcome the above disadvantage, certain modifications and refinements of the conventional welding process are required, and the manner in which these requirements are met forms the bases for the present disclosure. Standard resistance-type welding techniques have been modified so as to make use of short surges of current through the members to be joined, this current being of a relatively high value and being derived from an apparatus capable of storing energy for periodic utilization.

In accordance with a feature of the present invention, a hand-operated welding gun is provided which incorporates a plunger located within the gun barrel. This plunger is spring-loaded, and carries a quick-release chuck on the nose thereof. In operation, this quick-release chuck holds some element such as a thermocouple, which is brought into contact with a workpiece when the trigger of the gun is pulled, thereby, releasing the spring-loaded plunger. After contact between the thermocouple and workpiece is made, further movement of the trigger closes a built-in switch to send a high-amplitude pulse of current through the thermocouple from a suitable energy-storage unit which, in a preferred embodiment, is of the capacitor type. Thus, when the barrel of the welding gun is placed against the beryllium workpiece and the trigger pulled, the spring-loaded plunger first brings the thermocouple into contact with the workpiece, and then a surge of current flows through the thermocouple and the beryllium workpiece to form a spot weld. The chuck releases the thermocouple when the gun is drawn away to leave the thermocouple attached to the workpiece.

The gun is further designed with means for establishing a region around the weld area which can be filled with an inert gas during the welding operation, thereby precluding the entrance of oxygen and nitrogen of the atmosphere.

An important feature of the present invention is that the apparatus above described acts to place an element of relatively small physical dimensions (such as a thermocouple) into contact with the surface of a base member with a controllable and sustainable pressure, and, furthermore, without the possibility of backlash or rebound of the thermocouple from the surface of the base member following an initial engagement therebetween. Other features of the present invention, in addition to this matter of relative pressure between the components to be welded, are the inclusion in the gun design of the quick-release chuck carried by a spring-loaded plunger within the gun barrel, this chuck acting to hold the thermocouple or other component securely before and during the welding operation, while releasing the thermocouple in a positive fashion when the weld has been completed and the gun withdrawn. Still further, the welding gun herein described embodies a manually-actuatable trigger which, in effect, is of the two-stage type, first acting to control the position of the plunger which holds the thermocouple, and then acting to control the passage of current through the thermocouple and workpiece after the former has reached its proper welding position.

One object of the present invention, therefore, is to provide an improved form of welding gun especially designed to operate with elements of small physical dimensions.

Another object of the present invention is to provide a welding gun of the capacitance type in which energy through the members to be joined is caused to flow for relatively short periods of time.

An additional object of the invention is to provide a welding gun of a type particularly suitable for joining together two members between which a particular degree of pressure must be established and maintained during the welding process.

A still further object of the invention is to provide an improved apparatus especially suitable for joining Chromel-Alumel thermocouples to beryllium in an inert gas atmosphere.

Other objects and many of the attendant advantages of this invention will be readily appreciated as the same becomes better understood by reference to the following detailed description when considered in connection with the accompanying drawings wherein:

FIG. 1 is a longitudinal section of a preferred form of welding gun designed in accordance with the present invention, also showing the manner in which electrical conections may be made thereto from a suitable energy-storage system; and FIG. 2 is a front view of the welding gun of FIG. 1.

Referring now to the welding gun illustrated in FIGS. 1 and 2 of the drawings, it will be seen that this gun comprises a casing which is made up of a number of sections secured together by screws 8 to form a barrel 10 and a piston grip 12. The components forming this casing are composed of some suitable electrically-non-conductive material such as plastic or vulcanized rubber. Within the barrel 10 is a rod-like plunger 14 which is disposed for slidable movement longitudinally of the barrel. The latter carries therewithin a pair of fixed sleeves 16 and 18, the former being located near the forward end of the barrel 10 and the latter being located at the rear portion thereof. Each of the sleeves 16 and 18 is threaded interiorly to receive exteriorly-threaded nuts 20 and 22 respectively. The axial openings in these nuts act to slidably position the plunger 14, as illustrated.

Securely affixed to, and carried by, the plunger 14 is a cammed collar 24 which is located substantially midway between the fore and aft terminal portions of plunger 14 and acts as a component of a trigger release mechanism, further details of which will be set forth below. It might be mentioned at this point, however, that the collar 24 includes a shoulder 26 which normally engages one surface of a projection 28 extending from manually-operable trigger 30. As shown in solid lines in the drawing, this trigger projection 28 is in contacting relation with the shoulder 26 of collar 24 when the trigger 30 is in its normal inactive position.

Lying between the rearmost portion of collar 24 and the threaded nut 22 is a spring 32 which acts to bias the plunger 14 to a forward, or welding, position. In this welding position, the foremost surface 33 of the collar 24 is brought into engagement with the rearmost surface of threaded nut 20, and this action takes place when the trigger 30 is manually actuated to free the collar 24 from engagement therewith.

The trigger 30 is pivotally secured by a pin 34 to the barrel 10, so that the trigger is actuatable against the compression of a spring 36 from an inactive position, as shown in solid lines, to an active or welding position, as shown in broken lines. When the trigger 30 is initially actuated, the engagement between the projecting portion 28 of trigger 30 and the shoulder 26 of collar 24 is terminated, and the spring 32 causes the plunger 14 to move forward until the surface portion 33 of collar 24 engages the rearmost surface portion of the threaded nut 20. Obviously, the extent of such axial movement of plunger 14 is adjustable by rotation of nut 20 with respect to sleeve 16 prior to operation of the device.

The sleeve 16 is provided with a longitudinal opening therein through which passes a tube 38, one end of which projects into a chamber 40 (formed by the barrel 10 of the welding gun) and the other end of which leads to a source (not shown) of inert gas under pressure. Flow of gas from such source through tube 28 is controllable by the operator of the welding gun through actuation of a gas-control switch 42 carried on the grip portion of the gun the closing of which energizes a gas-control solenoid (not shown) of conventional design.

It is intended that the welding gun shown in FIGS. 1 and 2 may be employed to retain and position articles of small physical dimensions prior to and during the time that they are being welded to a base member or workpiece. Such a workpiece may be the plate illustrated as 44 in the drawing, and the article to be welded to this workpiece may be a thermocouple designated by the reference numeral 46. In a particular example for which the herein disclosed apparatus has been shown to be particularly advantageous, the workpiece 44 is composed of some substance such as beryllium, while the thermocouple 46 is a Chromel-Alumel wire .014" in diameter and encased in magnesium oxide powder with fiberglass insulation as the outer covering. Prior to the welding operation, the thermocouple is prepared by stripping from the terminal end thereof approximately ¼" of insulation, following which the Chromel-Alumel wires were joined by fusing the ends into a small ball as indicated by the reference numeral 48. The thermocouple 46 possesses a substantially S-shaped configuration as shown in the drawing. To establish and maintain the thermocouple under a predetermined degree of pressure during the welding operation it is held in a chuck 50 which is of the quick-release type. In other words, this chuck 50 grips the thermocouple securely during a forward movement of plunger 14, but releases the thermocouple upon a rearward movement of the plunger.

The welding gun of FIGS. 1 and 2 also includes therewithin a trigger-actuated switch 52 which is serially-connected to a pair of terminals 54 and 56. From terminal 56 a resilient cable 58 leads through a manually-actuatable knob 60 to the plunger 14. Adjustment of knob 60 permits an initial axial position to be determined for plunger 14 so that the chuck 50 may accommodate articles of varying sizes and shapes. Terminal 54, on the other hand, leads to an energy-storage system 62 of the capacitor type, from which energy may be obtained for short periods of time at a high amplitude. As shown in the drawing, this energy-storage system 62 is also electrically connected to the workpiece 44.

When it is desired to perform a welding operation, the barrel 10 of the welding gun is brought into contact with the base member of workpiece to which is to be welded the article (such as thermocouple 46) carried by the chuck 50. When contact between barrel 10 and workpiece 44 has been established, the trigger 30 is manually actuated against the pressure of spring 36. This releases the cammed collar 24 from engagement with projection 28 of the trigger, and spring 32 forces plunger 14 forwardly to bring the tip 48 of thermocouple 46 into contact with workpiece 44. As above mentioned, the amount of pressure applied to the thermocouple 44 is governed by the axial position of chuck 50 and this, in turn, depends upon the rotational status of nut 20 within the threaded sleeve 16.

The above description has assumed an initial movement of trigger 30 from its position as shown in solid lines to a position such that the collar 24 is disengaged therefrom. At this point, further movement of trigger 30 to a position as shown in broken lines actuates the plunger 64 of the discharge switch 52 and closes an electrical circuit from the energy-storage system 62 through terminal 54, cable 66, switch 52, cable 68, terminal 56 and conductor 58 to the plunger 14. From the plunger, current flows through chuck 50, thermocouple 46 and workpiece 44 back to the energy-storage system 62 to complete the circuit. The high-amplitude pulse of current which flows from the energy storage system 62 welds thermocouple 46 to workpiece 44 and establishes a firm junction therebetween. Following this surge of current, the barrel 10 of the welding gun is moved away from the workpiece 44. This produces a "forward" pull upon the chuck 50, which causes it to release the thermocouple 46 and allow the latter to remain attached to the workpiece.

It has been found in practice that this attachment between the members 44 and 46 much more closely approaches an opimum weld than any joint which is obtainable by utilizing presently-known apparatus.

During the welding operation, actuation of switch 42 causes gas to flow through tube 38 to the enclosed chamber 40 created by proximity of barrel 10 to the workpiece 44. When gas is thus admitted to chamber 40 (such gas, for example, being oxygen or nitrogen) the effectiveness of the welding action is greatly enhanced.

Obviously many modifications and variations of the present invention are possible in the light of the above teachings. It is therefore to be understood that within the scope of the appended claims the invention may be practiced otherwise than as specifically described.

We claim:

1. In a portable hand gun for welding a curved, flexible article to a base member and for maintaining such article under a predetermined degree of pressure during the welding operation, said gun comprising a barrel portion and a grip portion, a slidable plunger of electrically-conductive material carried in said barrel and spring-biased to an extended position, a trigger pivoted to the grip portion of said gun, said trigger having means projecting into said barrel for maintaining said plunger in a retracted position against the action of the biasing means associated therewith, a chuck carried on the forward portion of said plunger and designed to releasably support one end of the curved, flexible article to be welded, a tubular extension on said barrel and designed to contact said base member during the welding operation, plunger stop means disposed within said barrel and manually adjustable in position axially thereof, whereby an axial adjustment of said stop means determines the foremost position assumed by said chuck within said tubular barrel extension when said plunger is in its extended condition, and a switch actuatable by a selective movement of said trigger, whereby an initial movement of said trigger will cause said plunger to move to an exteded position in response to the action of its biasing means in which position both the outer end of said barrel extension and the remaining end of said article are brought into contact with said base member and said article is placed under a degree of pressure determined by the adjustment of said plunger stop means with respect to that end of said tubular barrel extension which has been brought into contact with said base member, and whereby a further movement of said trigger will actuate said switch from an open to an electrically closed position.

2. A portable hand gun as set forth in claim 1, in which said chuck is of the quick-release type adapted to become disengaged from said article when said gun is withdrawn from said base member following the welding of said article thereto.

3. Apparatus for spot-welding a curved, flexible article to a base member and for maintaining such article under a predetermined degree of pressure during the welding operation, said apparatus comprising a source of energy and a portable hand gun having a barrel and a grip portion, said gun including an extendable plunger slidably carried within said barrel, a chuck on the forward tip of said plunger and within which one end of said curved, flexible article is releasably supported, a tubular extension on said barrel the outer end of which is intended to contact said base member during the welding operation, plunger stop means disposed within said barrel and manually adjustable in position axially thereof, whereby an axial adjustment of said stop means determines the foremost position assumed by said chuck within said tubular barrel extension when said plunger is in its extended condition, a trigger pivoted to the grip portion of said gun and acting to control the positional status of said plunger, a switch within the grip portion of said gun and actuatable by a selective movement of said trigger, and an electrical circuit including said switch, said plunger, said article, said base member and said source of energy, whereby an initial movement of said trigger following contact between said gun barrel and said base member will cause a slidable movement of said plunger to its extended condition and bring the remaining end of said article into engagement with said base member with a predetermined degree of pressure, and whereby a further movement of said trigger will actuate said switch to close the said electrical circuit to cause energy to flow through said article and said base member to develop a spot weld therebetween.

References Cited in the file of this patent .

UNITED STATES PATENTS

| | | |
|---|---|---|
| 1,359,620 | Ritchey et al. | Nov. 23, 1920 |
| 2,217,964 | Nelson | Oct. 15, 1940 |
| 2,491,479 | Dash | Dec. 20, 1949 |
| 2,685,630 | Graham | Aug. 3, 1954 |
| 2,704,818 | North | Mar. 22, 1955 |
| 2,745,933 | Puckett | May 15, 1956 |
| 2,874,264 | Quinlan | Feb. 17, 1959 |